(12) United States Patent
Lee et al.

(10) Patent No.: US 12,140,979 B2
(45) Date of Patent: Nov. 12, 2024

(54) MULTI-PHASE BACKTRACKING OF PHOTOVOLTAIC MODULES

(71) Applicant: ARRAY TECHNOLOGIES, INC., Albuquerque, NM (US)

(72) Inventors: Kyumin Lee, Albuquerque, NM (US); Kendra Lynn Conrad, Littleton, CO (US)

(73) Assignee: ARRAY TECH, INC., Alburquerque, NM (US)

( * ) Notice: Subject to any disclaimer, the term of this patent is extended or adjusted under 35 U.S.C. 154(b) by 0 days.

(21) Appl. No.: 17/932,240

(22) Filed: Sep. 14, 2022

(65) Prior Publication Data

US 2023/0078507 A1  Mar. 16, 2023

Related U.S. Application Data (60) Provisional application No. 63/243,938, filed on Sep. 14, 2021.

(51) Int. Cl.
*G05D 3/10* (2006.01)
*H02S 20/32* (2014.01)

(52) U.S. Cl.
CPC ............. *G05D 3/105* (2013.01); *H02S 20/32* (2014.12)

(58) Field of Classification Search
CPC ................................ G05D 3/105; H02S 20/32
See application file for complete search history.

(56) References Cited

U.S. PATENT DOCUMENTS

| | | | | |
|---|---|---|---|---|
| 2011/0073161 A1* | 3/2011 | Scanlon | ................... | F24S 50/20 |
| | | | | 136/246 |
| 2013/0186451 A1* | 7/2013 | Tanti | ...................... | G09G 3/348 |
| | | | | 136/246 |
| 2014/0150774 A1* | 6/2014 | Chang | ..................... | F24S 25/10 |
| | | | | 126/600 |
| 2015/0214885 A1* | 7/2015 | Wu | ........................ | H02S 20/32 |
| | | | | 136/246 |

(Continued)

OTHER PUBLICATIONS

Fuentes-Morales et al., Control algorithms applied to active solar tracking systems: A review, Solar Energy, vol./Issue 212, pp. 203-219 (Year: 2020).*

(Continued)

*Primary Examiner* — Jayne L Mershon
(74) *Attorney, Agent, or Firm* — Maschoff Brenan (57) ABSTRACT

A method may include calculating a solar position of the Sun and a projected solar zenith (PSZ) relative to a position of a photovoltaic (PV) module. The method may include determining whether an orientation of the PV module is configurable to prevent shading of an upper substring of the PV module while shading a lower substring of the PV module. Responsive to determining that such an orientation is not configurable, the method may include determining whether the orientation of the PV module is configurable to prevent shading of both the upper substring and the lower substring. Responsive to determining that such an orientation is not configurable, the method may include determining whether the PSZ is within a maximum tracker angle range. A target tracker angle may be identified based on the PSZ and the maximum tracker angle range and used as a tracker angle control setpoint.

13 Claims, 9 Drawing Sheets

(56) References Cited

U.S. PATENT DOCUMENTS

2021/0103303 A1   4/2021  Sharp et al.
2021/0273602 A1\*  9/2021  Gu .......................... G05D 3/105

OTHER PUBLICATIONS

Nascimento et al., Backtracking Algorithm for Single-Axis Solar Trackers installed in a sloping field, International Journal of Engineering Research and Applications, vol. 5, Issue 12 (part-4), pp. 100-103 (Year: 2015).\*
International Search Report and Written Opinion mailed Jan. 31, 2023, in related PCT Application No. PCT/US2022/043538.

\* cited by examiner

MULTI-PHASE BACKTRACKING OF PHOTOVOLTAIC MODULES

CROSS-REFERENCE TO RELATED APPLICATION

This application claims the benefit of U.S. Patent Application Ser. No. 63/243,938, filed on Sep. 14, 2021; the disclosure of which is incorporated herein by reference in its entirety.

FIELD OF THE INVENTION

The present disclosure generally relates to a system and method of multi-phase backtracking of photovoltaic (PV) modules.

BACKGROUND

Systems of solar panels may include one or more PV modules. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include calculating a solar position of the Sun and a projected solar zenith (PSZ) relative to a position of a photovoltaic (PV) module. The method may include determining whether an orientation of the PV module is configurable to prevent shading of an upper sub string of the PV module while shading a lower substring of the PV module. Responsive to determining that such an orientation is not configurable, the method may include determining whether the orientation of the PV module is configurable to prevent shading of both the upper substring and the lower substring. Responsive to determining that such an orientation is not configurable, the method may include determining whether the PSZ is within a maximum tracker angle range. A target tracker angle may be identified based on the PSZ and the maximum tracker angle range and used as a tracker angle control setpoint.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The present disclosure relates to, among other things, a multi-phase backtracking process of angling and/or otherwise orienting PV modules to improve energy production by the PV modules. Backtracking of PV modules according to the present disclosure may provide one or more advantages over existing methods and/or systems of backtracking. For example, the multi-phase backtracking process may increase energy production by increasing the number of photons collected by the PV modules ("incident irradiance") and/or increasing the amount of exposure time to sunlight. Additionally or alternatively, the multi-phase backtracking process may increase the incident irradiance of the PV modules in situations in which the sunlight is weak and facilitate operation of the PV modules in more efficient operating regimes. Additionally or alternatively, the multi-phase backtracking process may improve operations of inverters coupled to the PV modules by increasing the amount of incoming power to the inverters, which may facilitate operation of the inverters in more efficient operating regimes.

Embodiments of the present disclosure are explained with reference to the accompanying figures.

Figure 1A:
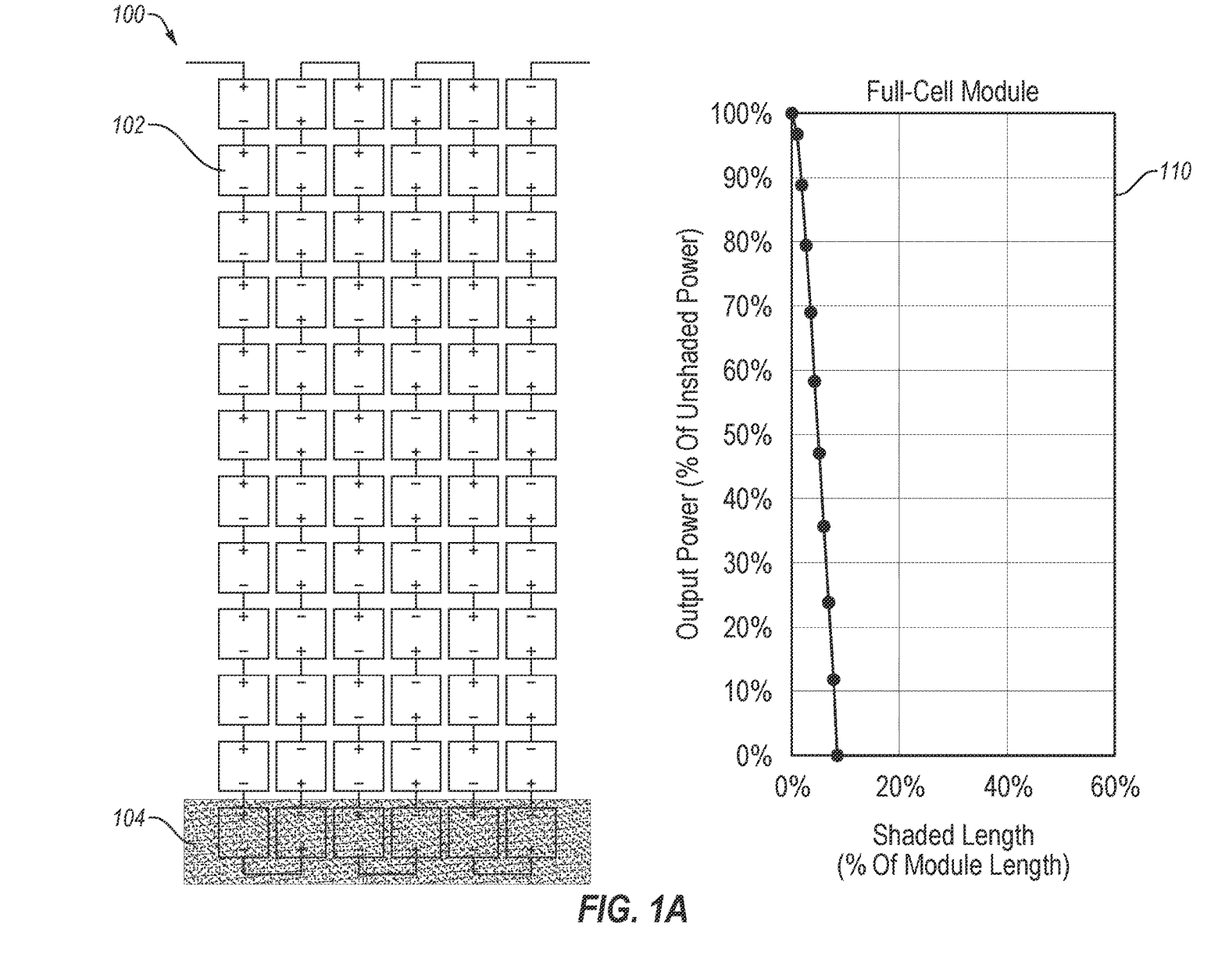
FIG. 1A illustrates an example of a full-cell photovoltaic (PV) module configuration.

FIG. 1A illustrates an example of a full-cell PV module configuration 100. Typical full-cell PV modules, such as the full-cell PV module 100, may include multiple PV cells 102 that are connected in series. In some circumstances, the PV cells 102 may be connected along a length of the full-cell PV module 100 (illustrated as vertical connections in FIG. 1A) to form columns of PV cells connected in series, and each of the columns of PV cells may be electrically connected to one another in series via the first PV cell and/or the last PV cell of each of the columns. As such, all of the PV cells 102 included in the full-cell PV module 100 may be connected to one another in series in an electric circuit.

In some situations, one or more of the PV cells 102 may be shaded because of the positioning of the sun, presence of cloud coverage, presence of obstructive features near the PV cells 102, shadows cast by angling of other PV modules near the full-cell PV module 100, etc. As illustrated in FIG. 1A, a bottom row of PV cells may include one or more shaded lower rows 104 of PV cells. Such shading of the rows 104 of PV cells may be caused by tilting of other PV modules in the vicinity of the full-cell PV module 100 in response to changes in positioning of the sun throughout a given day, which may cause portions of the lower rows 104 of PV cells to be shaded by the shadow cast by other angled PV modules. The shading of the lower rows 104 of PV cells may reduce the amount of energy that the PV cells 102 included in the shaded lower rows 104 may produce and/or otherwise prevent energy production by such PV cells 102.

Because the PV cells 102 of the full-cell PV module 100 are electrically connected in series, obstruction of energy production by the PV cells 102 included in the shaded lower rows 104 may result in a drastic decrease in energy production by the entire full-cell PV module 100 as the connection between PV cells 102 may be disrupted at the PV cells 102 included in the shaded lower rows 104. As illustrated in graph 110, a shading length of approximately ten percent of the full-cell PV module 100 may result in the power output of the full-cell PV module 100 dropping to substantially zero percent.

Figure 1B:
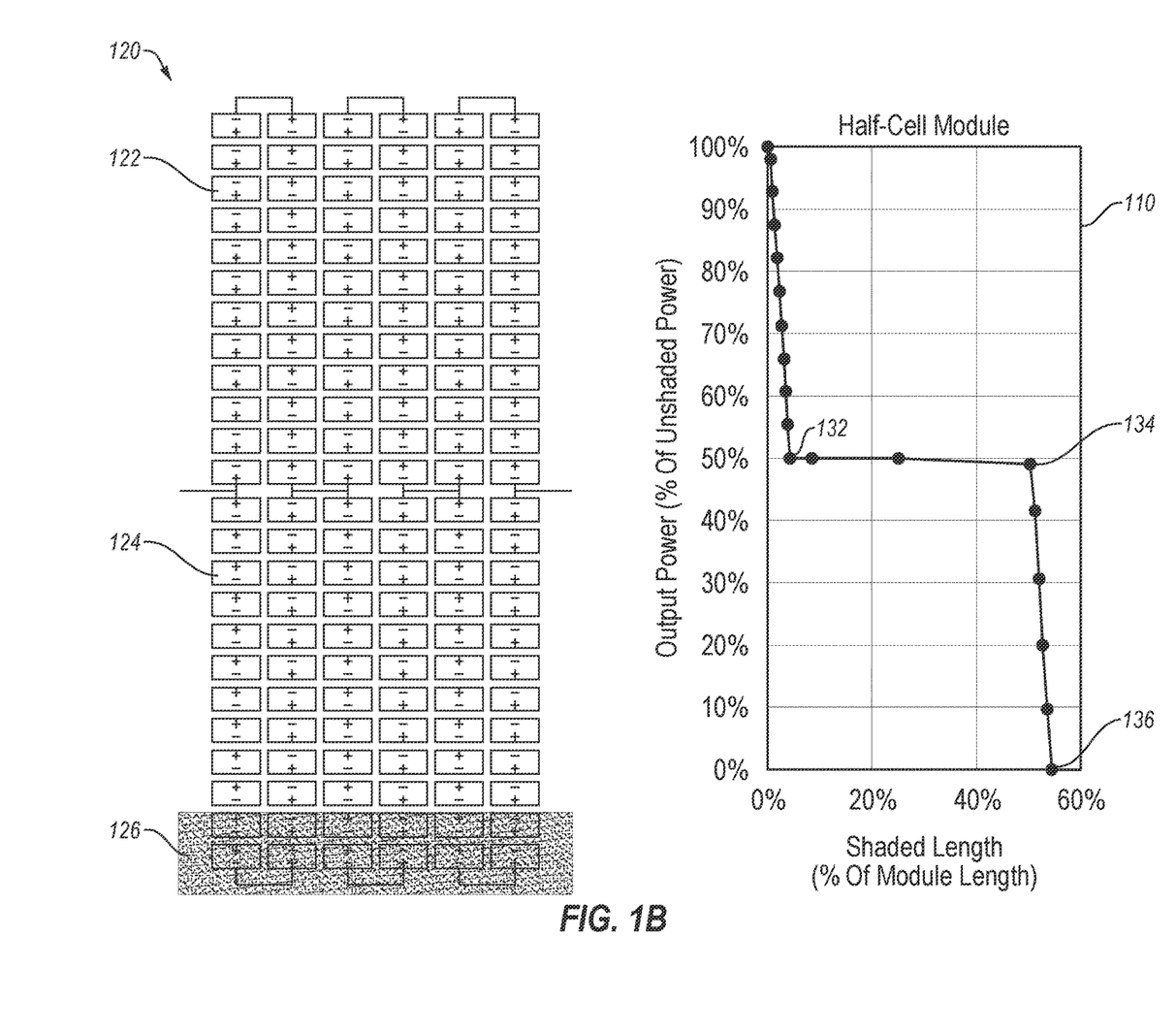
FIG. 1B illustrates an example of a half-cell PV module configuration.

To mitigate the reduction in power output due to shading or for other design considerations, a PV module may be configured as a half-cell PV module 120 as illustrated in FIG. 1B. The half-cell PV module 120 may include an upper array 122 of PV cells and a lower array 124 of PV cells in which each of the PV cells included in a particular array (e.g., the upper or lower) are electrically coupled together in series, and the upper and lower arrays of PV cells are electrically coupled to one another in parallel. In some situations, the number of PV cells included in the upper array 122 and/or the lower array 124 may be equal to or substantially similar to the number of PV cells included in the full-cell PV module 100 such that the amount of power output by each of the arrays 122 and 124 is the same as or similar to the amount of power output by the full-cell PV module 100.

In some situations, shading of the half-cell PV module 120 may affect one or more rows 126 of the lower array 124 before affecting any rows of the upper array 122. As illustrated in graph 130, the power output of the lower array 124 may be reduced to substantially zero percent due to the shaded lower rows 126 causing the overall power output of the half-cell PV module 120 to drop from one hundred percent power output to approximately fifty percent power output when approximately five percent of the total length of the half-cell PV module 120 is shaded at point 132. Because the upper array 122 and the lower array 124 are connected in parallel, however, the output power of the upper array 122 may be unaffected or substantially unaffected by shading of the lower array 124. As illustrated in the graph 130, the output power of the half-cell PV module 120 may remain at approximately fifty percent until approximately fifty percent of the length of the half-cell PV module 120 is shaded at point 134. After reaching the point 134, portions of the upper array 122 may begin to be shaded, which may reduce the output power of the upper array 122. As such, the overall output power of the half-cell PV module 120 may reduce to zero percent or substantially zero percent at point 136 when approximately five percent of the upper array 122 (or approximately fifty-five percent of the overall length of the half-cell PV module 120) is shaded.

Figure 2A:
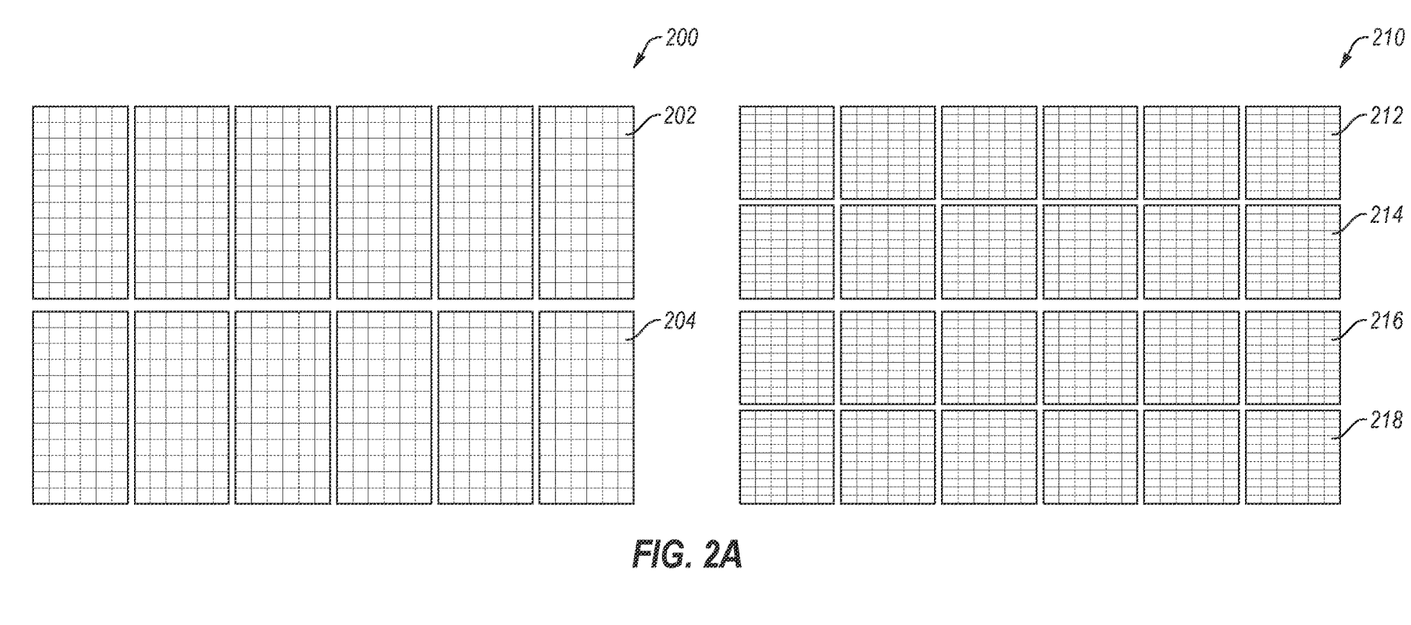
FIG. 2A illustrates examples of a full-cell, two-modules-in-portrait (2MIP) PV module configuration and a half-cell 2MIP PV module configuration.

FIG. 2A illustrates examples of a full-cell, two-modules-in-portrait (2MIP) PV module configuration 200 and a half-cell 2MIP PV module configuration 210. The full-cell 2MIP PV module 200 may include two full-cell PV modules, such as the full-cell PV module 100 described in relation to FIG. 1A, connected in parallel and in a lengthwise orientation. As such, the full-cell 2MIP PV module may include a PV cell configuration the same as or similar to the half-cell PV module 120 with respect to shading resistance. The half-cell 2MIP PV module 210 may include two half-cell PV modules, such as the half-cell PV module 120 described in relation to FIG. 1B, connected in parallel and in a lengthwise orientation such that the half-cell 2 MIP PV module 210 includes a first upper array 212, a first lower array 214, a second upper array 216, and/or a second lower array 218. Because the half-cell 2MIP PV module 210 includes two half-cell PV modules oriented in a lengthwise manner, the shading resistance of the half-cell 2MIP PV module 210 in the lengthwise direction may improve.

Figure 2B:
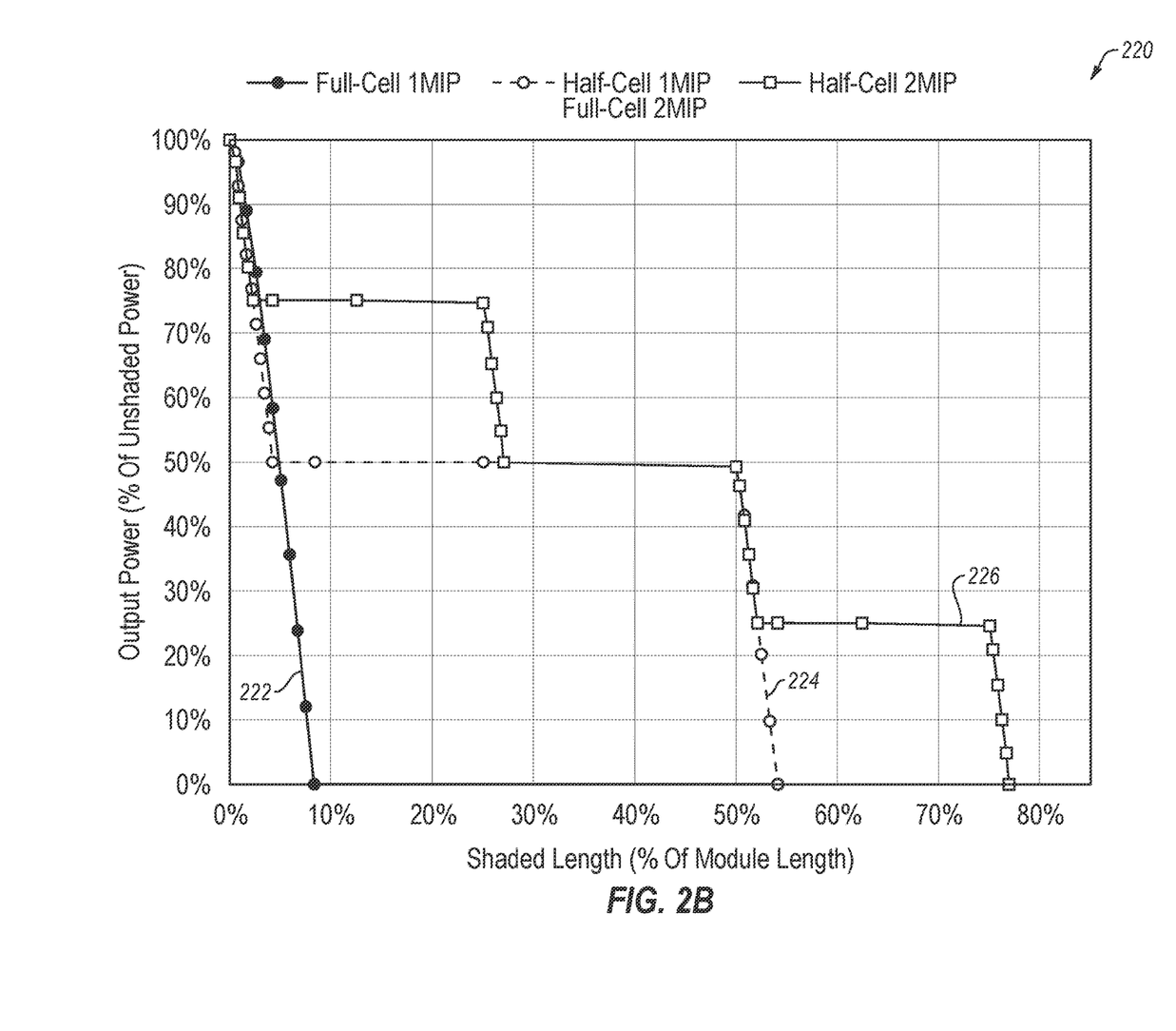
FIG. 2B depicts a graph illustrating a relationship between output power of various PV module configurations and a shaded length of the PV module.

FIG. 2B depicts a graph 220 illustrating a relationship between output power of various PV module configurations and a shaded length of the PV module. The graph 220 includes a first line 222 corresponding to the graph 110 illustrated in FIG. 1A describing a relationship between power output and shaded length of full-cell PV modules and a second line 224 corresponding to the graph 130 illustrated in FIG. 1B describing a relationship between power output and shaded length of half-cell PV modules. Additionally or alternatively, the second line 224 may describe a relationship between power output and shaded length of full-cell 2MIP PV modules.

Additionally or alternatively, the graph 220 may include a third line 226 describing a relationship between power output and shaded length of half-cell 2MIP PV modules. The half-cell 2MIP PV module 210 may include a shade resistance corresponding to shading of the first upper array 212, the first lower array 214, the second upper array 216, and/or the second lower array 218. For example, shading of only a portion of the second lower array 218 may cause the power output of the half-cell 2MIP PV module 210 to reduce by approximately twenty-five percent because the second lower array 218 accounts for approximately one-fourth of the power output of the half-cell 2MIP PV module 210. As additional examples, shading of the second lower array 218 and a portion of the second upper array 216 may cause the power output of the half-cell 2MIP PV module 210 to reduce by approximately fifty percent, and shading of the second lower array 218, the second upper array 216, and a portion of the first lower array 214 may reduce the power output of the half-cell 2MIP PV module 210 by approximately seventy-five percent. As another example, shading of the second lower array 218, the second upper array 216, the first lower array 214, and a portion of the first upper array 212 may reduce the power output of the half-cell 2MIP PV module 210 to substantially zero percent.

Figure 3A:
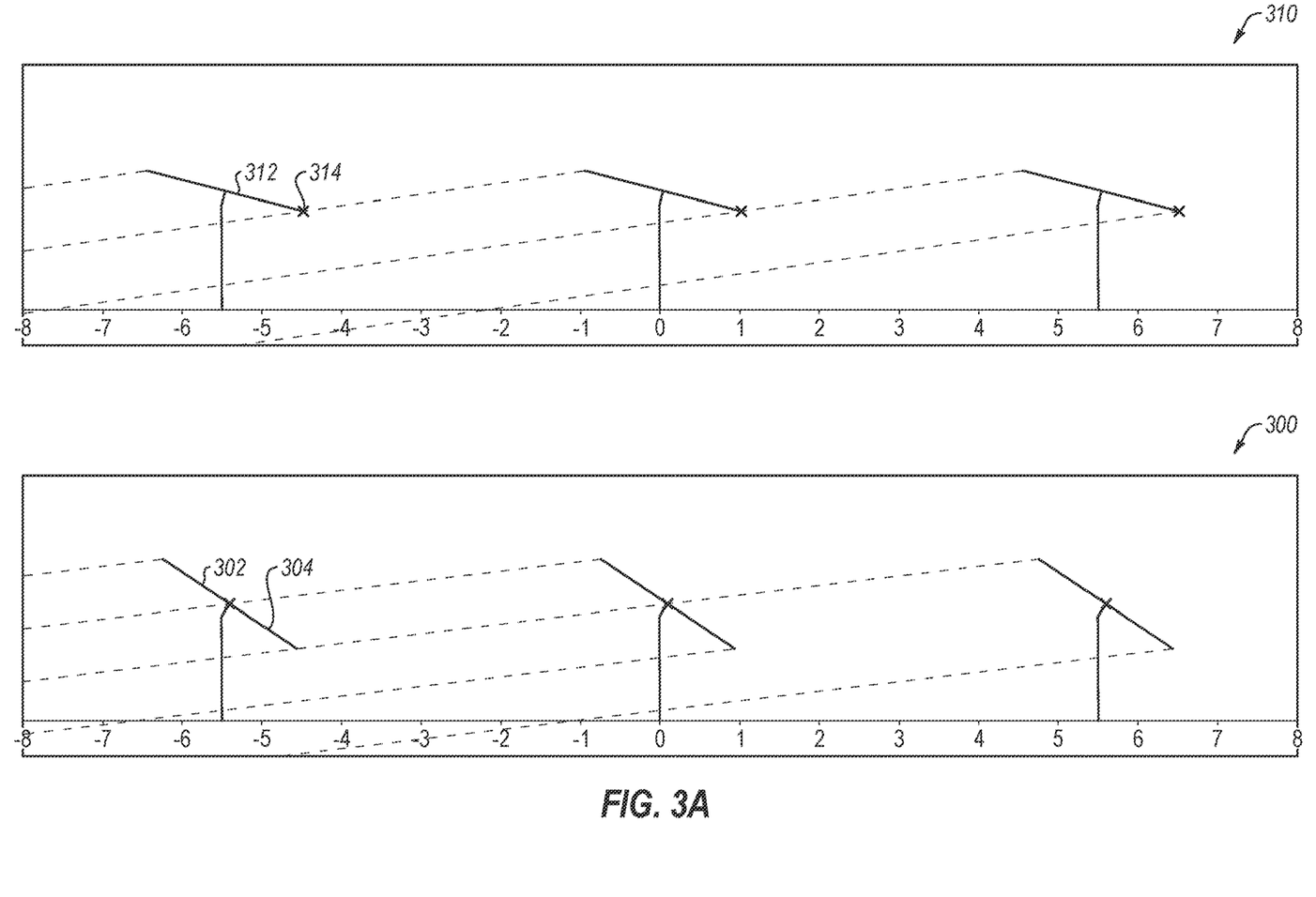
FIG. 3A illustrates an example embodiment of a backtracking system for a PV module system according to the present disclosure.
Figure 3B:
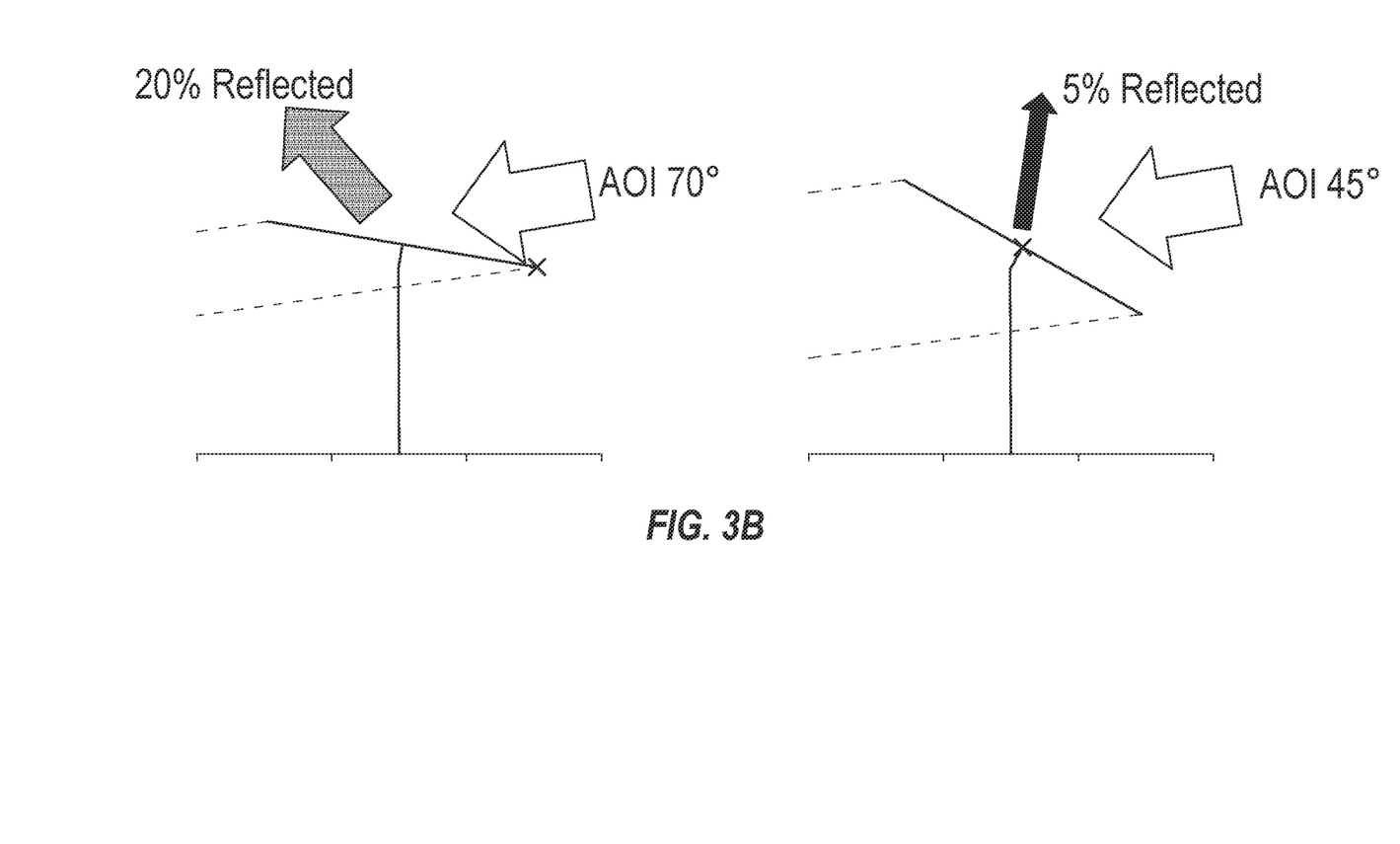
FIG. 3B illustrates light reflection due to the Fresnel effect.

FIG. 3A illustrates an example embodiment of a backtracking system 300 for a PV module system according to the present disclosure and a typical backtracking system 310. The typical backtracking system 310 may rotate one or more rows of PV modules to reduce row-to-row shading of each row of PV modules. As illustrated in FIG. 3A, for example, a particular row of PV modules according to the typical backtracking system 310 may be rotated such that a surface of the PV modules 312 is substantially or completely unobstructed by one or more adjacent rows of PV modules. However, rotating the rows of PV modules may increase an angle of incidence between incoming rays of sunlight and a surface of each PV module included in the row. As illustrated in FIG. 3B, increasing the angle of incidence may result in greater light reflection due to the Fresnel effect, which states that light reflectance at an interface (e.g., the interface between air and glass for PV modules) may increase as the angle of incidence increases.

In some embodiments, the backtracking system 300 may rotate one or more rows of PV modules including a half-cell PV module configuration, a full-cell 2MIP PV module configuration, and/or a half-cell 2MIP PV module configuration to reduce the angle of incidence between the incoming rays of sunlight and one or more of the upper rows 302 of PV cells included in the PV module, which may increase the shading of one or more lower rows 304 of PV cells. Rotating the rows of PV modules by the backtracking system 300 may reduce and/or eliminate sunlight reflection via the Fresnel effect by the upper rows 302 of PV cells. Additionally or alternatively, pre-existing and/or otherwise unavoidable shading of the lower rows 304 of PV cells may have already reduced the power output of the lower rows 304 such that increasing shading of the lower rows 304 has little to no effect on the overall power output of the row of PV modules.

Figure 4:
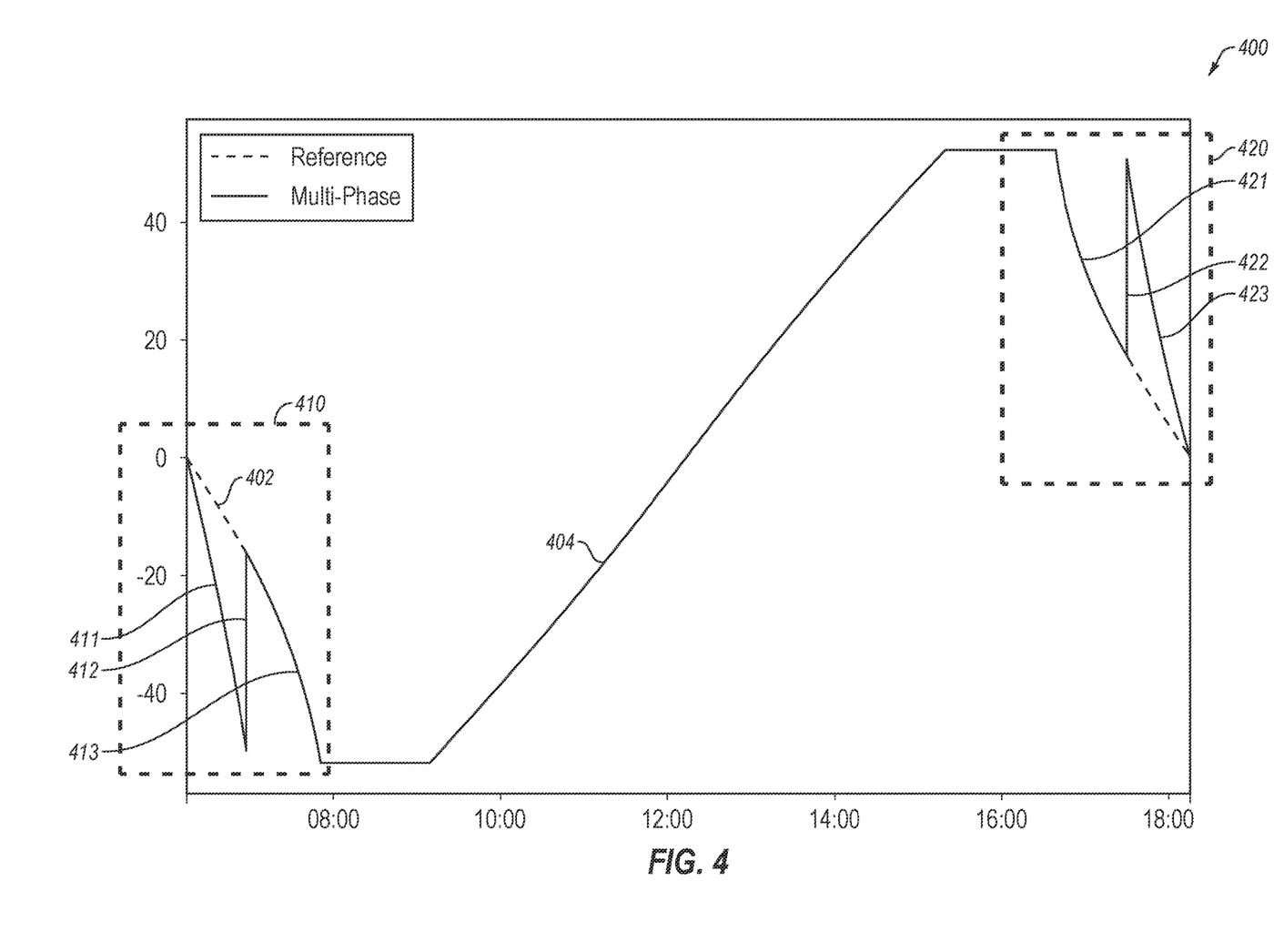
FIG. 4 depicts a graph illustrating a relationship between a degree of backtracking rotation and a time of day based on backtracking the PV module system according to the present disclosure.

FIG. 4 depicts a graph 400 illustrating a relationship between a degree of backtracking rotation and a time of day according to at least one embodiment of the backtracking system 300 according to the present disclosure. The graph 400 describes an orientation of given PV modules based on the degree of tilting of the given PV modules relative to a horizontal orientation of the given PV modules over the course of a day. The graph 400 includes a first line that represents a reference backtracking process 402, and a second line that may represent a multi-phase backtracking process 404 according to at least one embodiment of the present disclosure.

The reference backtracking process 402 that involves single-phase backtracking may begin with a PV cell, PV module, row of PV modules, etc. (herein referred to generally as "PV modules") oriented horizontally or substantially horizontally at a time before the sun rises (e.g., 6:00 A.M.) such that the PV modules may be tilted in a maximal amount towards the sky. The reference tracking process may involve primarily (or only) eastward rotations of PV modules during the above-referenced time ("the morning backtracking period"), with limited (or no) westward rotation during the morning backtracking period. As the sun rises, the PV modules may be gradually tilted so that the surfaces of the PV modules are directed towards the sun as it rises while avoiding shading from an adjacent row. After the orientation of the sun has reached a point where the row-to-row shading is no longer a concern, the PV modules may start to "track" the sun, being tilted to minimize the angle of incidence for the beam irradiance from the sun, as determined by the position of the sun and the physical limits of the tracking system. The PV modules may be tilted to continue to track the relative western movement of the sun until some identified time (e.g., 4:30 P.M.) at which time the PV modules may be gradually tilted back towards the horizontal orientation for the remainder of the day to avoid shading between rows of PV modules ("the evening backtracking"). The evening backtracking may primarily (or completely) include eastward rotations of PV modules, with limited (or no) westward rotation during the evening backtracking period.

In some embodiments, a multi-phase backtracking process 404 may include multi-phase backtracking that involves different tracker rotations during morning backtracking 410 and/or multi-phase backtracking that involves different tracker rotations during evening backtracking 420. The differences between the morning backtracking 410 and the reference backtracking process 402 may be due to the morning backtracking 410 involving two phases of eastward rotation, with a westward rotation in between. During the first phase of eastward rotation 411, there may be partial or complete shading of the lower half of the PV modules, while the rows of PV cells included in the upper half of the PV modules may be directed towards the sun at a lower angle of incidence relative to the PV modules tilted according to the reference backtracking process 402. In some embodiments, the first phase of eastward rotation 411 may end as the geometrical configuration may not allow the lower half of the PV modules to be fully shaded as the sun rises (e.g., after a certain amount of sun rise and rotation, the row-to-row shading may only partially shade the lower half of the PV modules), after which the PV modules may produce more energy by rotating the PV modules such that both the upper and lower halves of the PV modules may be unshaded. At the end of the first phase of eastward rotation 411, a westward rotation phase 412 may begin, after which a second phase of eastward rotation 413 may occur. The second phase of eastward rotation 413 may be the same as or similar to the reference backtracking process 402 for the overlapping time period.

The multi-phase backtracking process 404 may include multi-phase backtracking that involves different tracker rotations from the reference backtracking process 402 during the evening backtracking 420. The differences between the evening backtracking 420 and the reference backtracking process 402 may be due to the evening backtracking 420 involving two phases of eastward rotation, with a westward rotation in between. The first evening phase of eastward rotation 421 may be the same as or similar to the reference backtracking process 402 for the overlapping time period. In some embodiments, the first evening phase of eastward rotation 421 may end because the geometrical configuration may allow the lower half of the PV modules to be partially or fully shaded as the sun sets, after which the PV modules may produce more energy by putting the upper half of the PV modules at lower angle of incidence. For example, after a certain amount of sun-setting and/or due to the geometrical configuration of the PV modules, the row-to-row shading may necessarily shade at least part of the lower half of the PV modules and/or it may be possible to fully shade the lower half of the PV modules by the row-to-row shading. At the end of the first evening phase of eastward rotation 421, there may be a westward rotation phase 422 to rotate the PV modules towards the west, after which a second evening phase of eastward rotation 423 takes place. During the second evening phase of eastward rotation 423, there may be partial or complete shading of the lower half of the PV modules, while the rows of PV cells included in the upper half of the PV modules may be directed towards the sun at a lower angle of incidence relative to the PV modules tilted according to the reference backtracking process 402.

Although the PV modules are described in relation to the graph 400 as beginning at a horizontal or substantially horizontal orientation at zero degrees and tilting at a specified rate (e.g., tilting fifty degrees in a first direction over a two-hour timespan between 6:00 A.M. and 8:00 A.M.), the starting orientation, the rate of tilting, the degree of tilting, and/or any other rotation and/or timing parameters of the PV modules may be adjusted according to the environment in which the PV modules are situated. For example, a sunrise and/or a sunset time may differ between the winter months and the summer months in a particular location. As another example, geographic and/or other physical features may affect the positioning and/or the orientation of the PV modules such that the rate and/or the degree of tilting the PV modules differs from the graph 400 illustrated in FIG. 4. As another example, various weather conditions may affect the positioning and/or the orientation of the PV modules because the PV modules may be positioned to reduce damage caused by adverse weather conditions, such as high winds, rain, hail, etc.

Additionally, while illustrated with a first inflection point in the morning and a second inflection point in the afternoon for a single half-panel PV module row or full-cell 2 MIP PV modules, it will be appreciated that the same principle may be extended to other configurations. For example, the graph of FIG. 4 may correspond to the second line 224 of FIG. 2B. If the principle is extended to the half-cell 2 MIP configuration and the line 226 of FIG. 2B, there may be multiple inflection points in the morning and afternoon. In some embodiments, a balance may be struck between the efficiency gains in repeatedly shifting the row of PV modules and the shorter amounts of time in which the higher power generation may be obtained. For example, considerations such as wear on the PV tracking system, power generation, power consumption, etc. may go into the balancing.

Figure 5A:
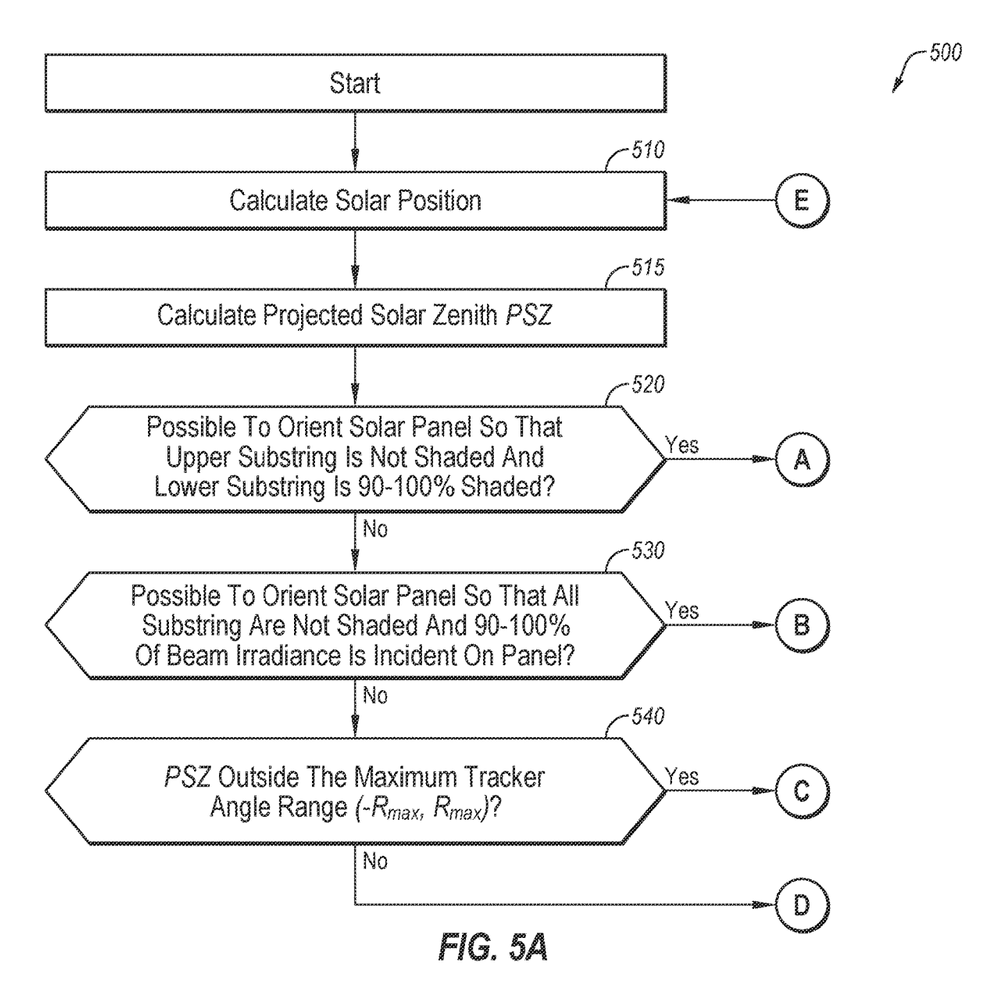
FIGS. 5A and 5B are a flowchart of an example method of multi-phase backtracking according to the present disclosure.
Figure 5B:
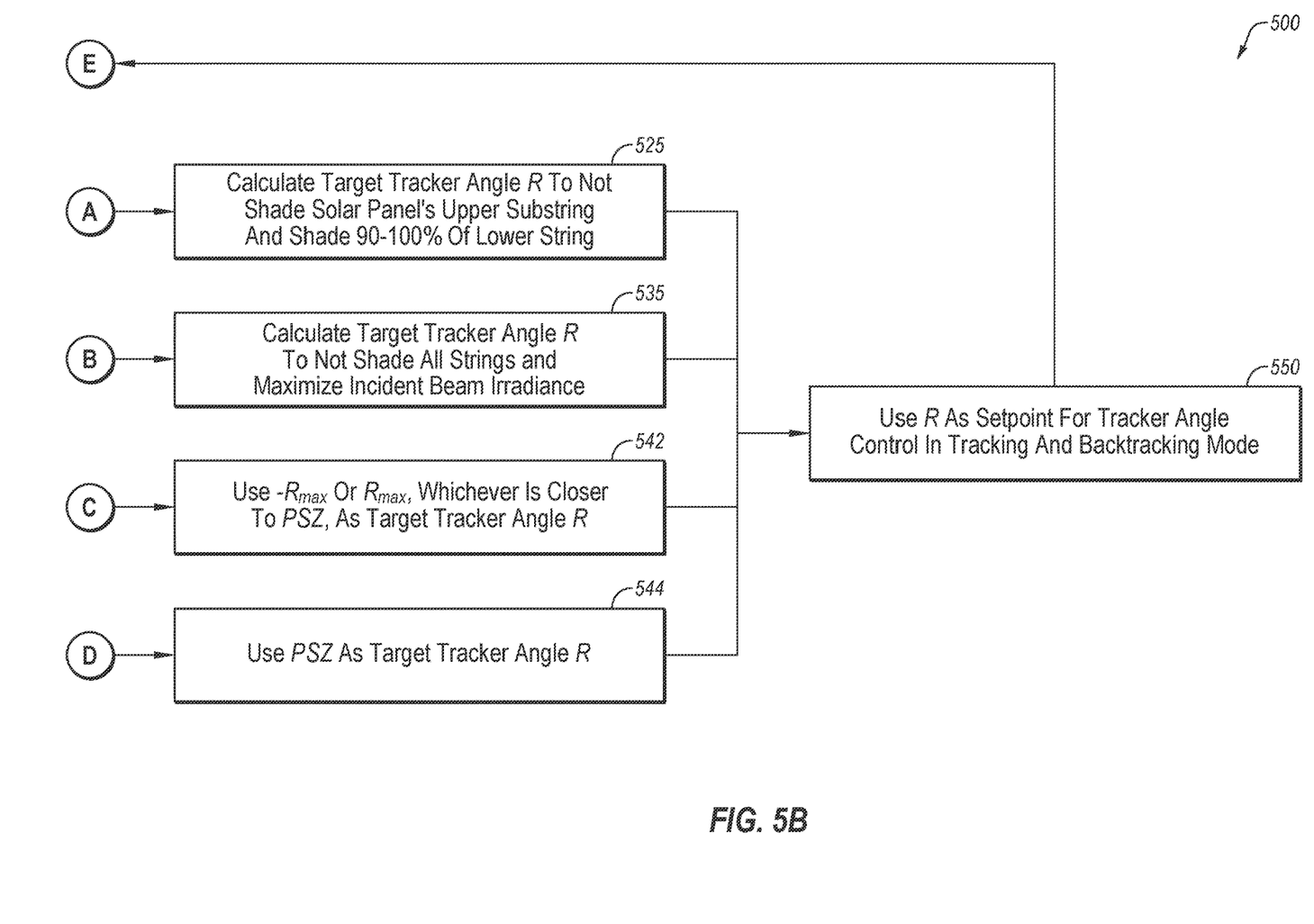

FIGS. 5A and 5B are a flowchart of an example method 500 of multi-phase backtracking according to the present disclosure. The method 500 may be performed by any suitable system, apparatus, or device. For example, a computer system and/or a PV module configured according to the present disclosure may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method may begin at block 510, where a solar position is determined. The solar position may be a position of the Sun relative to one or more PV modules at the time that the solar position is calculated. In some embodiments, a computer system associated with a particular PV module may calculate the solar position based on geographical and geometrical factors. For example, the computer system consider a latitude-longitude location of the PV module, a time of day at which the solar position is calculated, an angle of the PV module due to terrain on which the PV module is situated, a sunrise time for the particular day on which the solar position is calculated, or a sunset time for the particular day on which the solar position is calculated for determining the solar position of the Sun relative to the PV module. Additionally or alternatively, the solar position may be determined by one or more sensors, such as image sensors or irradiance sensors, that track the solar position.

In these and other embodiments, the solar position may be determined by empirical data collected over time regarding a particular PV module site. For example, the position of the Sun may be observed and recorded at regular intervals, such as every minute, five minutes, fifteen minutes, thirty minutes, one hour, two hours, three hours, or four hours, over a particular period of time, such as one year, two years, three years, or four years. The solar position at a particular point in time may be determined by referencing historical solar position data. In this and other examples, the solar position at the particular point in time may be interpolated or extrapolated based on the historical solar position data.

At block 515, a PSZ may be determined based on the solar zenith and solar azimuth angles determined in block 510. In some embodiments, the PSZ may be determined by projecting the solar position to a plane orthogonal to the tracker's axis of rotation, and then measuring the angle from the vertical axis to the projection. For example, FIG. 6 illustrates an example of projecting a solar position 602 to a plane 600 orthogonal to the tracker's axis of rotation 604 and measuring an angle 608 from a vertical axis 606 to the projected solar position 602. Based on the measured angle 608 relative to the projected solar position 602, a projected solar zenith 610 may be determined.

In some embodiments, an axis azimuth and an axis tilt of the tracker axis of rotation may be included in the PSZ calculation, in which case the tracker axis of rotation may not be parallel to the North-South axis and the plane orthogonal to the tracker axis of rotation may not be perpendicular to the ground horizontal plane. In some embodiments, the PSZ may be negative for times before solar noon and positive for times after solar noon. Additionally or alternatively, the negative and the positive notation of the PSZ may be inverted with the PSZ being positive before solar noon and negative after solar noon. In some embodiments, terms such as "true tracking angle" and "sun angle" may be used instead of PSZ.

In some embodiments, a computer system associated with the PV module may determine the PSZ based algorithmically. In these and other embodiments, a PSZ algorithm may factor in the solar position of the Sun determined at block 510, the geographical location of the PV module, the time of day, or the time of year to predict the PSZ and/or a time of day corresponding to the PSZ. Additionally or alternatively, the PSZ may be determined empirically based on historical solar zenith positions and/or times from previous days, seasons, or years in the same or similar geographical locations as the geographical location in which the PV module is situated.

At block 520, whether it is possible to orient the PV module so that an upper substring of PV module is not shaded while simultaneously shading most or all of a lower sub string (e.g., 90% to 100% of a surface area of the lower substring) may be determined by checking if the PSZ is with a range defined by $PSZ_{min,50}$ and $PSZ_{max,50}$, which are determined by the following equations:

$$PSZ_{min,50} = \frac{\text{Row Spacing} - 0.5 \cdot \text{Table Width} \cdot \cos(R_{min} + CS)}{0.5 \cdot \text{Table Width} \cdot \sin(R_{min} + CS)} - CS$$

$$PSZ_{max,50} = \frac{\text{Row Spacing} - 0.5 \cdot \text{Table Width} \cdot \cos(R_{max} + CS)}{0.5 \cdot \text{Table Width} \cdot \sin(R_{max} + CS)} - CS$$

where the Row Spacing is the horizontal spacing from one tracker row to another, the Table Width is the width of a tracker row, which may be one module length in one-module-in-portrait (1MIP) configurations and two module lengths in 2MIP configurations, $R_{min}$ is the maximum tracker angle towards the direction that the PSZ is negative, $R_{max}$ is the maximum tracker angle towards the direction that the PSZ is positive, and CS is the cross-axis slope angle which is the slope angle between a tracker row to the tracker row in front, measured from the horizontal ground. In some embodiments, the cross-axis slope angle may be positive when the slope is uphill towards the direction that the PSZ is positive, and the cross-axis slope angle may be negative when the slope is uphill towards the direction that the PSZ is negative.

Responsive to determining that it is possible to tilt, rotate, or otherwise reorient the PV module to shade most or all of the lower substring while not shading the upper substring, a target tracker angle, R, for affecting such a reorientation of the PV module may be determined at block 525 with the following equations:

$$\Delta R = \cos^{-1}\left(\frac{\text{Row Spacing}}{0.5 \cdot \text{Table Width}} \cdot (\cos PSZ - \tan CS \cdot \sin PSZ)\right)$$

$$R = PSZ - \Delta R$$

At block 530, whether it is possible to orient the PV module so that neither the upper substring nor the lower substring of the PV module is shaded may be determined responsive to determining that it is not possible to reorient the PV module to shade most or all of the lower substring while not shading the upper substring at block 520. Whether both the upper and lower substrings can be unshaded by using a tracker angle different from the PSZ and a tracker angle different from the minimum and maximum tracker angles may be determined by checking if the PSZ is within a range defined by $PSZ_{min,100}$ and $PSZ_{max,100}$, which may be determined by the following equations:

$$PSZ_{min,100} = \frac{\text{Row Spacing} - \text{Table Width} \cdot \cos(R_{min} + CS)}{\text{Table Width} \cdot \sin(R_{min} + CS)} - CS$$

$$PSZ_{max,100} = \frac{\text{Row Spacing} - \text{Table Width} \cdot \cos(R_{max} + CS)}{\text{Table Width} \cdot \sin(R_{max} + CS)} - CS$$

Responsive to determining that it is possible to tilt, rotate, or otherwise reorient the PV module to avoid shading the upper substring and the lower substring, a target tracker angle, R, for affecting such a reorientation of the PV module may be determined at block 535 with the following formula:

$$\Delta R = \cos^{-1}\left(\frac{\text{Row Spacing}}{\text{Table Width}} \cdot (\cos PSZ - \tan CS \cdot \sin PSZ)\right)$$

$$R = PSZ - \Delta R$$

At block 540, whether the PSZ is outside of a maximum tracker angle range may be determined responsive to determining that it is not possible to orient the PV module so that neither the upper substring nor the lower substring of PV module is shaded at block 530. In some embodiments, the maximum tracker angle range may be between a first tracker angle $R_{min}$ that represents a maximum tracker angle in a first direction and a second tracker angle $R_{max}$ that represents the maximum tracker angle in a second direction opposite to the first direction. As such, the first tracker angle and the second tracker angle may each include the same or similar tilt angles but oriented in opposite directions, $-R_{max}$ and $R_{max}$, and the maximum tracker angle range may be bound between $-R_{max}$ and $R_{max}$.

In these and other embodiments, the minimum tracker angle, $R_{min}$, and the maximum tracker angle, $R_{max}$, may each be determined by the physical limits of the tracker, or by software settings used in the control system. For example, the minimum tracker angle, $R_{min}$, may be −52 degrees, and the maximum tracker angle, $R_{max}$, may be +52 degrees because the solar tracker may be limited to being oriented at tilt angles between −52 degrees and +52 degrees either physically or according to parameters associated with an electronic control system.

Responsive to determining that the PSZ is outside of the tracker angle range defined by the minimum tracker angle and the maximum tracker angle, either the minimum tracker angle or the maximum tracker angle may be used as the target tracker angle at block 542. Responsive to determining that the PSZ is smaller than the minimum tracker angle, the target tracker angle may be set as the minimum tracker angle. Responsive to determining that the PSZ is greater than the maximum tracker angle, the target tracker angle may be set as the maximum tracker angle.

At block 544, responsive to determining that the PSZ is greater than the minimum tracker angle and less than the maximum tracker angle (e.g., the PSZ is between a tracker angle range defined by the minimum tracker angle and the maximum tracker angle), the target tracker angle may be set as the PSZ.

At block 550, the target tracker angle may be used as a setpoint for tracker angle control in a tracking mode and/or a backtracking mode. In some embodiments, the target tracker angle used as the setpoint for tracker angle control may indicate a tilt angle to which the PV module may be oriented according to one or more algorithms associated with the PV module's tracking mode and/or backtracking mode.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

calculating a solar position of the Sun;

calculating a projected solar zenith (PSZ) based on the solar position of the Sun and a position of first photovoltaic (PV) modules on a first tracker row and second PV modules on a second tracker row, wherein each of the first and second PV modules include an upper substring of solar cells and a lower substring of solar cells;

evaluating the following expressions to determine whether it is possible to position the PV modules in an orientation that limits shading of the upper substring of the PV modules by not more than a first threshold amount while shading the lower substring of the PV modules by at least a second threshold amount:

$$PSZ_{min,50} = \frac{\text{Row Spacing} - 0.5 \cdot \text{Table Width} \cdot \cos(R_{min} + CS)}{0.5 \cdot \text{Table Width} \cdot \sin(R_{min} + CS)} - CS$$

$$PSZ_{max,50} = \frac{\text{Row Spacing} - 0.5 \cdot \text{Table Width} \cdot \cos(R_{max} + CS)}{0.5 \cdot \text{Table Width} \cdot \sin(R_{max} + CS)} - CS$$

where Row Spacing is a horizontal spacing between the first and second tracker rows, Table Width is the width of the first and second tracker rows, Rmin is a maximum tracker angle towards a direction that PSZ is negative, Rmax is a maximum tracker angle towards a direction that PSZ is positive, and CS is a slope angle between the first and second tracker rows;

responsive to determining that it is possible to position the PV modules in an orientation that prevents shading of the upper substring of the PV modules by at least the first threshold amount while shading the lower substring of the PV modules by at least the second threshold amount, calculating a target tracker angle that prevents shading of the upper substring of the PV modules by at least the first threshold amount while shading the lower substring of the PV modules by at least the second threshold amount; and positioning the PV modules at the target tracker angle.

2. The method of claim 1, wherein calculating the PSZ includes:

projecting the solar position of the Sun to a plane orthogonal to the first and second tracker rows;

measuring an angle from a vertical axis to the projection of the solar position of the Sun; and determining a positive notation or a negative notation of the PSZ based on whether a time associated with the calculation of the PSZ is before or after solar noon.

3. The method of claim 1, wherein the first threshold is 10%.

4. The method of claim 1, wherein the second threshold is 90%.

5. The method of claim 1, wherein calculating the target tracker angle includes evaluating the following expression:

$$\Delta R = \cos^{-1}\left(\frac{\text{Row Spacing}}{0.5 \cdot \text{Table Width}} \cdot (\cos PSZ - \tan CS \cdot \sin PSZ)\right).$$

6. A method, comprising:

calculating a solar position of the Sun;

calculating a projected solar zenith (PSZ) based on the solar position of the Sun and a position of first photovoltaic (PV) modules on a first tracker row and second PV modules on a second tracker row, wherein each of the first and second PV modules include an upper substring of solar cells and a lower substring of solar cells;

determining whether it is possible to position the PV modules in an orientation that limits shading of the upper substring of the PV modules by not more than a first threshold amount while shading the lower substring of the PV modules by at least a second threshold amount;

responsive to determining that it is not possible to position the PV modules in an orientation that prevents shading of the upper substring of the PV modules by at least the first threshold amount while shading the lower substring of the PV modules by at least the second threshold amount, evaluating the following expressions to determine whether it is possible to position the PV modules in an orientation that prevents shading of the upper and lower substrings of the PV modules by at least a third threshold amount while an amount of beam irradiance incident on the upper and lower substrings of the PV modules exceeds a fourth threshold:

$$PSZ_{min,100} = \frac{\text{Row Spacing} - \text{Table Width} \cdot \cos(R_{min} + CS)}{\text{Table Width} \cdot \sin(R_{min} + CS)} - CS$$

$$PSZ_{max,100} = \frac{\text{Row Spacing} - \text{Table Width} \cdot \cos(R_{max} + CS)}{\text{Table Width} \cdot \sin(R_{max} + CS)} - CS$$

where Row Spacing is a horizontal spacing between the first and second tracker rows, Table Width is the width of the first and second tracker rows, Rmin is a maximum tracker angle towards a direction that PSZ is negative, Rmax is a maximum tracker angle towards a direction that PSZ is positive, and CS is a slope angle between the first and second tracker rows;

responsive to determining that it is possible to position the PV modules in an orientation that prevents shading of the upper and lower substrings of the PV modules by at least the third threshold amount, calculating a target tracker angle that prevents shading of the upper and lower substrings of the PV modules by at least the third threshold amount; and positioning the PV modules at the target tracker angle.

7. The method of claim 6, wherein calculating the PSZ includes:

projecting the solar position of the Sun to a plane orthogonal to the first and second tracker rows;

measuring an angle from a vertical axis to the projection of the solar position of the Sun; and determining a positive notation or a negative notation of the PSZ based on whether a time associated with the calculation of the PSZ is before or after solar noon.

8. The method of claim 6, wherein the first threshold is 10%.

9. The method of claim 6, wherein the second threshold is 90%.

10. The method of claim 6, wherein the third threshold is 90%.

11. The method of claim 6, wherein the fourth threshold is 90%.

12. The method of claim 6, wherein determining whether it is possible to position the PV modules in an orientation that limits shading of the upper substring of the PV modules by not more than a first threshold amount while shading the lower substring of the PV modules by at least a second threshold amount includes evaluating the following expressions:

$$PSZ_{min,50} = \frac{\text{Row Spacing} - 0.5 \cdot \text{Table Width} \cdot \cos(R_{min} + CS)}{0.5 \cdot \text{Table Width} \cdot \sin(R_{min} + CS)} - CS$$

$$PSZ_{max,50} = \frac{\text{Row Spacing} - 0.5 \cdot \text{Table Width} \cdot \cos(R_{max} + CS)}{0.5 \cdot \text{Table Width} \cdot \sin(R_{max} + CS)} - CS.$$

13. The method of claim 6, wherein calculating the target tracker angle includes evaluating the following expression:

$$\Delta R = \cos^{-1}\left(\frac{\text{Row Spacing}}{0.5 \cdot \text{Table Width}} \cdot (\cos PSZ - \tan CS \cdot \sin PSZ)\right).$$

\* \* \* \* \*